United States Patent

Toriyama

[15] 3,659,102

[45] Apr. 25, 1972

[54] LASER BEAM POWER MEASUREMENT

[72] Inventor: Kazuhisa Toriyama, Tokyo, Japan

[73] Assignee: Hitachi, Ltd., Tokyo, Japan

[22] Filed: Sept. 18, 1969

[21] Appl. No.: 858,980

[52] U.S. Cl. ........................................250/71.5, 250/83.3 R
[51] Int. Cl. ........................................................G01t 39/18
[58] Field of Search..................235/151.3, 193; 250/71.5 R, 250/71 R, 83.3 IR, 83.3 R; 252/301.2, 301.3

[56] References Cited

UNITED STATES PATENTS 2,974,231 3/1961 Greenblatt et al...................250/83.3
3,070,698 12/1962 Bloembergen..................250/83.3 IR

OTHER PUBLICATIONS

Triplet Excitons and Delayed Fluorescence in Anthracene Crystals by Kepler et al. Physical Review Letters (10) No. 9 May 1 '63 pp. 400-02

*Primary Examiner*—James W. Lawrence
*Assistant Examiner*—D. C. Nelms
*Attorney*—Craig, Antonelli, & Hill

[57] ABSTRACT

Absolute measurement of the power output of a radiation energy utilizing the intensity of fluorescence of the secondary emission process from a body of a molecular crystal irradiated by the radiation energy under measurement.

4 Claims, 6 Drawing Figures

6
RUBY ROD
7
5
ANTHRACENE
10
SPECTROSCOPE
11
12
PHOTOMULTIPLIER
13
AMPLIFIER
14
SYNCHROSCOPE cm⁻¹
28,000
25,000
15,000
4
(¹Ag, ¹Bg)
3
(¹B2u)
γ
KST
2
(³B2u)
1
(¹Ag)

6
RUBY ROD
7
5
ANTHRACENE
10
SPECTROSCOPE
11
12
PHOTOMULTIPLIER
13
AMPLIFIER
14
SYNCHROSCOPE

INVENTOR

KAZUHISA TOKEYAMA

BY Craig, Antonelli, Stewart & Hill

ATTORNEYS

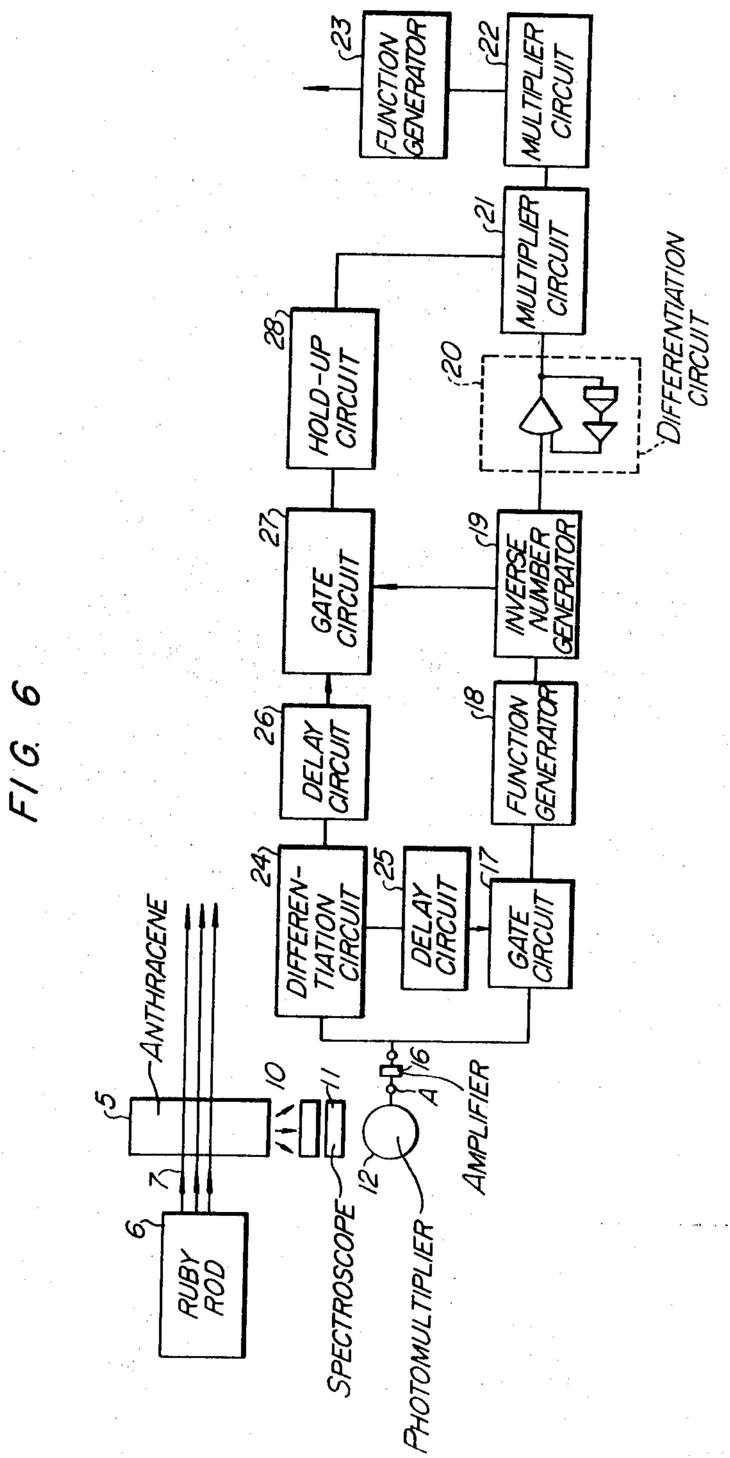
INVENTOR
KAZUHISA TOKEYAMA
BY Craig, Antonelli, Stewart & Hill
ATTORNEYS

LASER BEAM POWER MEASUREMENT

BACKGROUND OF THE INVENTION

1. Field of the Invention:

This invention relates to an absolute measurement of the power of a laser beam and more particularly to a method and an apparatus for measuring laser beam power utilizing the fluorescence of a molecular crystal emitted in the secondary process.

2. Description of the Prior Art

Lasers have wide and various potentials in their application based on their monochromaticity, high intensity and coherency. Conventionally, the power output of a laser beam has usually been measured by a photoelectric or calorimetry system.

However, regarding photoelectric measurement, the sensitivity of a photoelectric cell depends on the wavelength of the light beam under measurement so that precise calibration is needed before an absolute measurement can be taken. In a thermal detector (for example, a thermocouple), the heat capacity is rather large for light beam detection, so that the time constant for measurement is too large to precisely detect a rapid laser beam radiation such as a ruby laser or a giant pulse.

SUMMARY OF THE INVENTION

An object of the present invention is to utilize in instruments for laser beam power detection the fluorescence of a molecular crystal emitted in the secondary process so as to provide a rapid response beam power measurement by which absolute measurement is enhanced and which has eliminated the above drawbacks of the conventional beam power meters.

Another object of the present invention is to provide a direct reading beam power meter comprising means for reading out the power of the initial light beam irradiated onto molecular crystals utilizing the fluorescence emitted in the secondary process of the molecular crystal.

BRIEF DESCRIPTION OF THE DRAWINGS

FIG. 6 is a block diagram of a direct reading beam power measuring system of the invention having an electronic computing circuit for direct reading.

DESCRIPTION OF THE PREFERRED EMBODIMENTS

Figure 1:
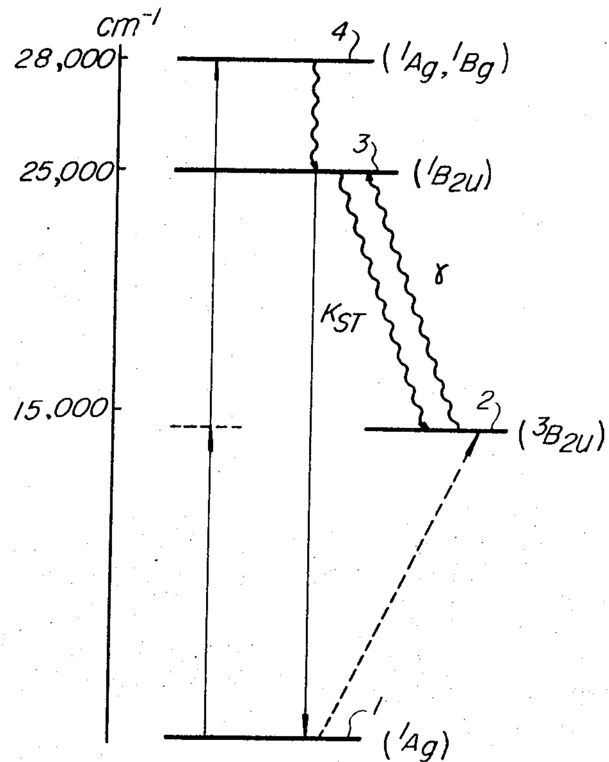
FIG. 1 is an energy diagram of a molecular crystal, anthracene, for use in the beam power measurement of the present invention.
Figure 2:
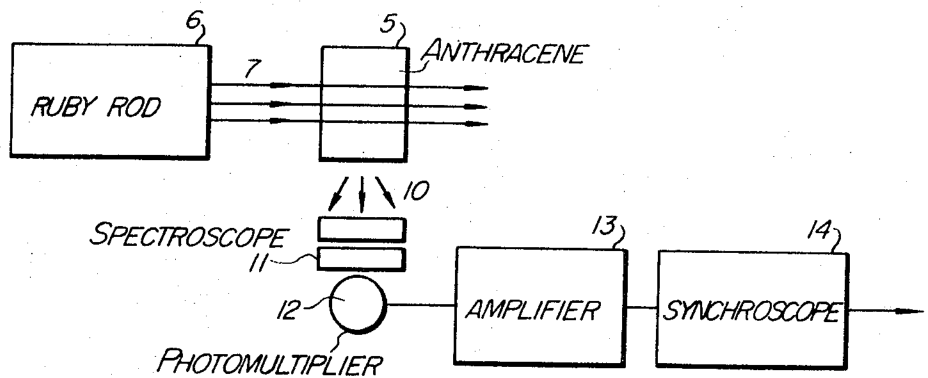
FIG. 2 is a block diagram of a beam power measuring system of the present invention.

As is shown in FIG. 1, the energy levels of a molecular crystal of anthracene comprise a ground state 1 ($^1A_g$), an excited state 4 ($^1A_g$ $^1B_g$), another excited state 2 ($^3B_{2u}$) intermediate between the states 1 ($^1A_g$) and 4 ($^1A_g$ $^1B_g$), and yet another excited state 3 ($^1B_{2u}$) intermediate between the states 4 ($^1A_g$ $^1B_g$) and 2 ($^3B_{2u}$). When a laser beam 7 (6943 A) is emitted from a ruby rod 6 onto a body of anthracene crystal 5 as is shown in FIG. 2, the anthracene molecules in the ground state 1 ($^1A_g$) are elevated to the excited state 4 ($^1A_g$ $^1B_g$) by the two photon absorption of the laser beam and then shift down to the excited state 3 ($^1B_{2u}$) by a non-radiative transition. From the state 3 ($^1B_{2u}$), some molecules directly return to the ground state 1 ($^1A_g$) by the first process fluorescence and the rest shift down to the state 2 ($^3B_{2u}$) by non-radiative transition. The initial concentration $y_o$ of such molecules in the excited state 2 ($^3B_{2u}$) can be represented as $$y_o = K_{ST}\, t_f\, t_1\, \delta\, I_o^2 \qquad (1)$$

where:

$K_{ST}$ is the rate constant of radiationless singlet-triplet conversion from excited states 3 ($^1B_{2u}$) to 2 ($^3B_{2u}$), i.e. the proportional constant representing the transition probability from the state 3 to the state 2, $t_f$ is the lifetime for the excited state 3 ($^1B_{2u}$), $t_1$ is the duration of irradiation of the laser beam, $\delta$ is the coefficient of two photon absorption and is thus the absorption coefficient in the case of one photon absorption, and $I_o$ is the intensity of the irradiating laser beam. Here, the molecular concentration of the excited state 2 ($^3B_{2u}$) in an equilibrium state before the irradiation by a laser beam is neglected.

Anthracene molecules in the excited state 2 ($^3B_{2u}$) having the above concentration shift up to the state 3 ($^1B_{2u}$) by collisions of a triplet exciton and then return to the ground state 1 ($^1A_g$) with emission of fluorescence of the secondary process.

Setting the concentration of anthracene in the state 2 ($^3B_{2u}$) in the above process as $y$, the variation of concentration per unit time is written as $$dy/dt = -\gamma y^2 \qquad (2)$$

Here, the transition probability from the state 2 ($^3B_{2u}$) to the ground state 1 ($^1A_g$) is neglected since it is a forbidden transition and the time needed for a molecule in the state 2 to exhaust its triplet exciton energy and transit to the ground state is far longer than that for the transition from states 2 ($^3B_{2u}$) to 3 ($^1B_{2u}$) with bimolecular reaction.

Solving differential equation (2) with condition of equation (1), the concentration of anthracene becomes $$y(t) = yo/(\gamma y_o t + 1) \qquad (3).$$

In the secondary process, such anthracene molecules get energy to transit to the state 3 and then to the ground state by the emission of fluorescence. The intensity $F(t)$ of such fluorescence is $$F(t) = \tfrac{1}{2} A\gamma\, [yo/(\gamma y_o t + 1)]^2 \qquad (4).$$

Figure 3:
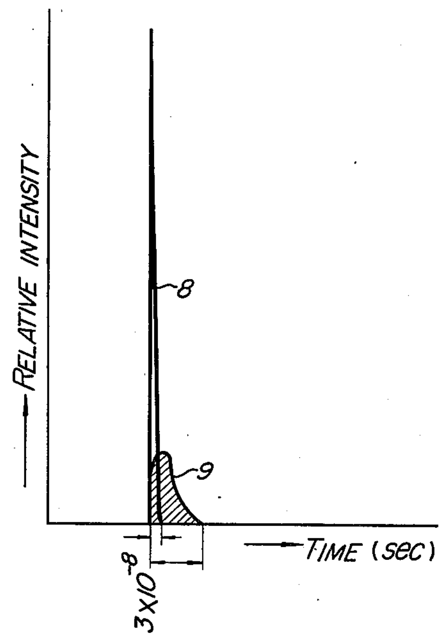
FIG. 3 shows the intensity of fluorescence characteristics of the first and the second processes of anthracene vs. time.

This relation can be seen in FIG. 3 in which the abscissa represents time (second) and the ordinate represents the relative intensity. Curve 8 represents the fluorescence emitted in the first process and curve 9 that for the secondary process.

From equation (4), it is seen that the inverse square root of the intensity $1/\sqrt{F}$ and time are in a linear relation of $$\frac{1}{\sqrt{F(t)}} = \sqrt{\frac{2}{A\gamma}}\left(\gamma t + \frac{1}{y_0}\right).$$

The line has a slope of $(2\gamma/A)^{1/2}$ and an expected extrapolated value of $[(\tfrac{1}{2} A\gamma)^{1/2} y_o]^{-1}$ at $t = 0$ (which is not the time of irradiation but a certain time after the irradiation). Dividing the slope by the extrapolated value, $$\frac{\text{slope}}{1/\sqrt{F(0)}} = \frac{\partial(1/\sqrt{F(t)})/\partial t}{[(\frac{1}{2}A\gamma)^{1/2}y_0]^{-1}} \equiv \gamma y_0 \qquad (5)$$

Therefore, the value of $y_o$ in equation (5) can be calculated from the intensity of fluorescence $F(t)$ in the secondary process.

Since the rate constant of radiationless singlet-triplet conversion $K_{ST}$, the lifetime of excited singlet 3 ($^1B_{2u}$) $t_f$, and the duration of laser beam irradiation $t_l$, coefficient of two photon absorption $\delta$ are constants for a definite material, the absolute measurement of a laser beam can be calculated from a modification of equation (1)

$$I_0 = \sqrt{\frac{y_0}{K_{ST} t_f t_1 \delta}} \qquad (6)$$

The present invention is based on the above theoretical analysis on the fluorescence of the secondary process of a molecular crystal. Now, embodiments of the invention will be described hereinafter.

EMBODIMENT 1

Figure 4:
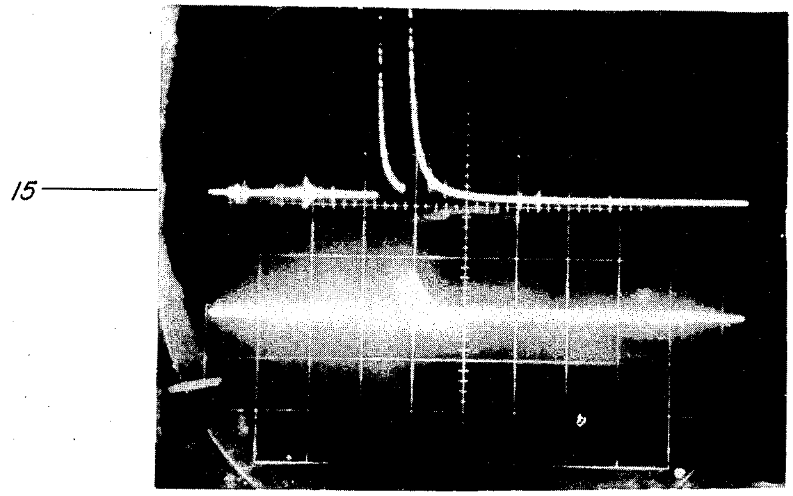
FIG. 4 is a photograph of fluorescence obtained on the face of a synchroscope by the measuring system of FIG. 2.
Figure 5:
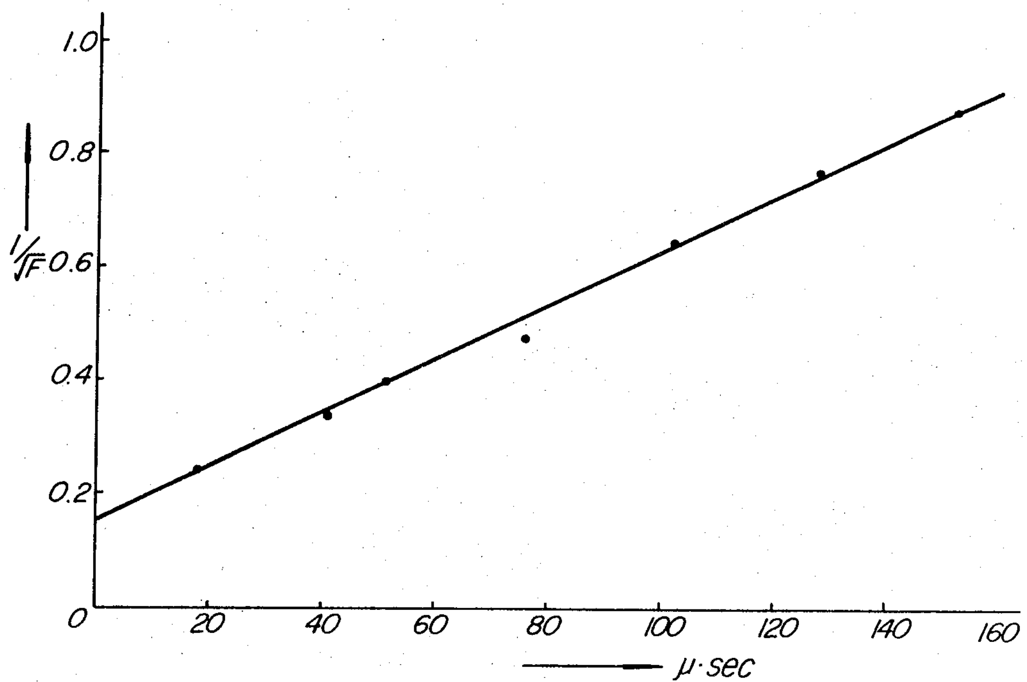
FIG. 5 is a correlation plot diagram of the inverse square root of the intensity of fluorescence obtained by the light beam power measuring system of the present invention vs. time.

As is shown in FIG. 2, an anthracene body 5 is irradiated by a laser beam 7 emitted from a ruby rod 6. Fluorescence 10 from the anthracene body 5 is detected with a photomultiplier 12 through a spectroscope or a $CuSO_4$ solution filter 11. The photo-current obtained from the photomultiplier 12 is supplied to a synchroscope 14 through an amplifier 13 to give the curve of fluorescence, such as curves $15_1$ and $15_2$ in FIG. 4. In the figure, the ordinate represents the intensity of fluorescence while the abscissa represents time. Tail portions $15'_1$ and $15'_2$ of the fluorescence curve correspond to the fluorescence in the secondary process. The result of analysis of FIG. 4 is shown in the $1/\sqrt{F(t)}$ vs. time (micro-second) plotting of FIG. 5 where $1/\sqrt{F(t)}$ is in an arbitrary unit. The constants used in this embodiment were as follows:

$K_{ST}=20\times10^5$ sec$^{-1}$ $t_f=3\times10^{-8}$ sec $t_1=3\times10^{-8}$ sec $\delta=1.26\times10^{-29}$ cm.sec.photon$^{-1}$ and $\gamma=5\times10^{-11}$ sec.

Thus, $I_o=2\times10^{26}$ photon.cm$^{-2}$.sec$^{-1}$ is obtained.

EMBODIMENT 2

A laser beam 7 is directed from a ruby rod 6 onto a molecular crystal of anthracene 5 as is shown in FIG. 6. Fluorescence 10 emitted from the anthracene 5 is detected by a photomultiplier 12 through a spectroscope (or $CuSO_4$ filter) 11.

The photo-current of the photomultiplier 12 which becomes proportional to the intensity of fluorescence $F$ after a certain time has passed from the initial irradiation obeys theoretical equations (5) and (6) as is described above. FIG. 6 shows an embodiment of an electronic computing circuit for calculating the beam power $I_o$ of a laser beam. In the figure, a photo-current $F$ is supplied to a terminal A from which it is transferred through an amplifier 16 to both a differentiation circuit 24 and a gate circuit 17. The differentiation circuit 24 shapes the admitted current signal into a pulse and sends it to gate circuits 17 and 27 through delay circuits 25 and 26 to open the gates. Upon releasing the gate circuit 17, the photo-current $F$ is admitted through the gate to a function generator 18 which generates the square root of an input. The delay time of the delay circuit 25 is preferably the duration of the first process fluorescence i.e. about $3\times10^{-8}$ sec. The square root $\sqrt{F}$ is supplied from the function generator 18 to an inverse number generator 19 to obtain $1/\sqrt{F}$ which is sent on one hand to a differentiation circuit 20 to become $\partial(1/\sqrt{F})/\partial t$ and on the other hand to an initial value hold-up circuit 28 upon the release of the gate circuit 27. The inverse of the square root $1/\sqrt{F(t=t_1)}$ from the hold-up circuit 28 and the differential of the inverse square root $\partial(1/\sqrt{F(t)})/\partial t$ are multiplied by $1/\gamma$ at a multiplier circuit 21 ($t_1$ is the delay time of the delay circuit 26 relative to the rise of the first process fluorescence) and sent to another multiplier circuit 22 to perform a multiplication of $$\frac{1}{\sqrt{F_{t=t_1}}}\cdot\frac{\partial(1/\sqrt{F(t)})}{\partial t}\cdot\frac{1}{\gamma K_{ST}t_f t_1\delta}$$

The square root of this value is obtained at a function generator 23. The beam power of the laser beam 7

$$I_0=\sqrt{\frac{y_0}{K_{ST}t_f t_1\delta}}=\sqrt{\frac{1}{\gamma}\cdot\frac{1}{\sqrt{F(o)}}\cdot\frac{\partial(1/\sqrt{F(t)})}{\partial t}\cdot\frac{1}{K_{ST}t_f t_1\delta}}$$

is thus obtained at the output terminal of the function generator 23.

The beam power meter of the above construction has the following advantages:

1. it does not measure the beam power of a laser beam itself but the fluorescence of a molecular crystal due to the irradiation by a laser beam so that absolute measurement of the beam power is possible with a photoelectric detector of high sensitivity (one-, two-, or three-photon absorption or more can be utilized);

2. further, in absolute measurement, the beam power can be measured by detecting only a part of the fluorescence from the crystal by transmitting a laser beam through a crystal; and 3. there is no need to reduce the laser beam power with a filter as is the case with conventional photoelectric detection causing no problem of the need for calibrating a filter and there is also no need to calibrate a detector.

It is to be noted that other molecular crystals similar to anthracene, such as phenanthrene, phyrene, or 3,4-benzpyrene, which emit fluorescence in the secondary process, can also be utilized in the invention.

I claim:

1. A method of measuring a beam power comprising the steps of directing a laser beam to be measured onto a body of molecular crystal which can emit fluorescence of the secondary process, a second step of measuring the intensity of fluorescence of the secondary process emitted from said molecular crystal upon irradiation, and a third step of calculating the absolute value of the beam power to be measured from said intensity of fluorescence.

2. A method of measuring a beam power according to claim 1, wherein the second step is done with a photoelectric detector after the lifetime of a singlet excited state has passed after the irradiation, and the third step comprises amplifying the output photo-current of said detector, taking the square root thereof, and the inverse square root, holding up the inverse of the square root for a certain time on one hand, differentiating the inverse of the square root on the other hand, multiplying both of these values and the inverse of the product of the lifetime of a singlet state of the crystal, the duration of irradiation, coefficient of photon absorption for the transition to said singlet excited state, and the triplet-triplet annihilation rate constant, and taking the square root of their product to obtain the beam power.

3. A beam power meter comprising:

a body of a molecular crystal for receiving and transmitting a laser beam to be measured, the molecular crystal being capable of emitting fluorescence of the first and secondary process;

a photoelectric detector means for detecting the intensity of the fluorescence from said body after the lifetime of the singlet excitation state has passed from the time of the emission of fluorescence;

amplifier means for amplifying the photo-current $F$ from said detector means;

a first circuit means including a differentiation circuit for shaping the photo-current into a pulse, a delay circuit for giving a delay to the pulse signal, and a gate circuit for receiving the delayed pulse signal;

a second circuit means including a gate circuit for receiving the photo-current $F$, a delay circuit for receiving said shaped pulse signal and sending it to the gate circuit with a delay to open the gate, a function generator for taking the square root of the photo-current $\sqrt{F}$, and an inverse number generator for taking the inverse of the square root of the photo-current $1/\sqrt{F(t)}$ and sending it to both the gate circuit of said first circuit means and a differentiation circuit;

a hold-up circuit for receiving the initial value of $1/\sqrt{F}$ through the gate circuit of the first circuit means upon releasing of the gate;

multiplier circuit means for receiving $1/\sqrt{F_{t=t_1}}$ from the hold-up circuit and $$\partial\left(\frac{1}{\sqrt{F(t)}}\right)\Big/\partial t$$

from the differentiation circuit of said second circuit means calculating $$\frac{1}{\sqrt{F_{t=t_1}}} \cdot \frac{\partial(1/\sqrt{F(t)})}{\partial t} \cdot \frac{1}{\gamma K_{ST} t_f t_l \delta};$$

and a function generator connected to the multiplier circuit for taking the square root of the input $$\frac{1}{\sqrt{F_{t=t_1}}} \cdot \frac{\partial(1\sqrt{F(t)})}{\partial t} \cdot \frac{1}{\gamma K_{ST} t_f t_l \delta}$$

to obtain the beam power of the laser beam to be measured;

$\gamma$ being the triplet-triplet annihilation rate constant, $K_{ST}$ being the rate constant of radiationless singlet-triplet conversion from the excited state $^1B_{2u}$ to the excited state $^3B_{2u}$, $t_f$ being the lifetime of the excited state $^1B_{2u}$, $t_l$ being the duration of irradiation of the laser beam under measurement, and $\delta$ being the coefficient of two photon absorption.

4. A beam power meter according to claim 3, wherein said molecular crystal is selected from the group consisting of anthracene, pyrene, phenanthrene, and 3,4-benzpyrene.

* * * * *

UNITED STATES PATENT OFFICE
CERTIFICATE OF CORRECTION

Patent No. 3,659,102 Dated April 25, 1972

Inventor(s) Kazuhisa Toriyama

It is certified that error appears in the above-identified patent and that said Letters Patent are hereby corrected as shown below:

Page 1, left-hand column between item [21] and item [52] insert -- [30] foreign application priority data --

September 20, 1968, Japan, 67630/68

Signed and sealed this 9th day of January 1973.

(SEAL)
Attest:

EDWARD M. FLETCHER, JR.
Attesting Officer

ROBERT GOTTSCHALK
Commissioner of Patents